United States Patent [19]

Thorpe

[11] 3,774,958
[45] Nov. 27, 1973

[54] SHEET METAL COVER FOR A TRUCK BODY

[76] Inventor: Ervin T. Thorpe, Des Moines, Iowa

[22] Filed: Feb. 14, 1972

[21] Appl. No.: 225,785

[52] U.S. Cl.................... 296/98, 160/238, 160/266, 160/271
[51] Int. Cl............................................. B60p 7/04
[58] Field of Search........................... 296/100, 98; 160/238, 266, 271, 26

[56] References Cited
UNITED STATES PATENTS

| | | | |
|---|---|---|---|
| 3,488,087 | 1/1970 | Cox................................ | 296/100 X |
| 1,331,122 | 2/1920 | Olsen.............................. | 296/98 X |
| 2,594,597 | 4/1952 | Taylor............................. | 296/100 X |
| 3,363,666 | 1/1968 | Hodgson et al................ | 160/238 X |
| 2,213,601 | 9/1940 | White............................. | 296/98 |

Primary Examiner—Leo Friaglia
Assistant Examiner—Randall A. Schrecengost
Attorney—Zarley, McKee & Thomte

[57] ABSTRACT

A sheet metal cover for truck bodies is disclosed herein and generally comprises a resilient sheet metal member such as stainless steel or the like wound upon a cylindrical member which is rotatably mounted forwardly of the upper portion of the front wall of the truck body. Guide means are provided on the upper ends of the side walls of the truck body for receiving the lateral edges of the sheet metal member therein when the sheet metal member covers the truck body. The guide means define a sinusoidal configuration to provide lateral strength to the sheet metal member when the sheet metal member covers the truck body. A plurality of cylindrical rods are positioned around the cylindrical member and have rollers thereon to rollably contain the sheet metal member when it is wound upon the cylindrical member. The cylindrical member is driven by a reversible motor or the like.

9 Claims, 5 Drawing Figures

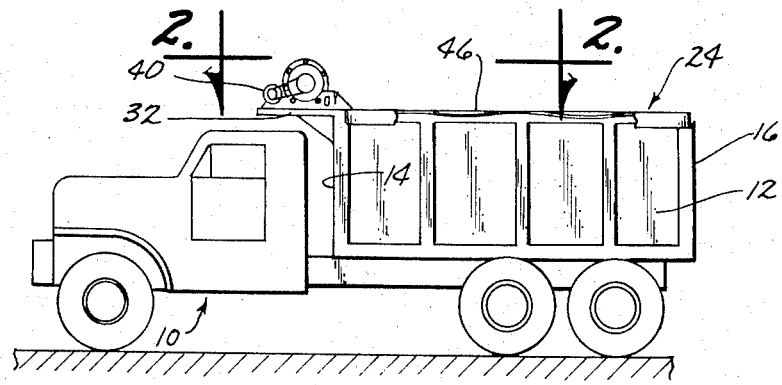
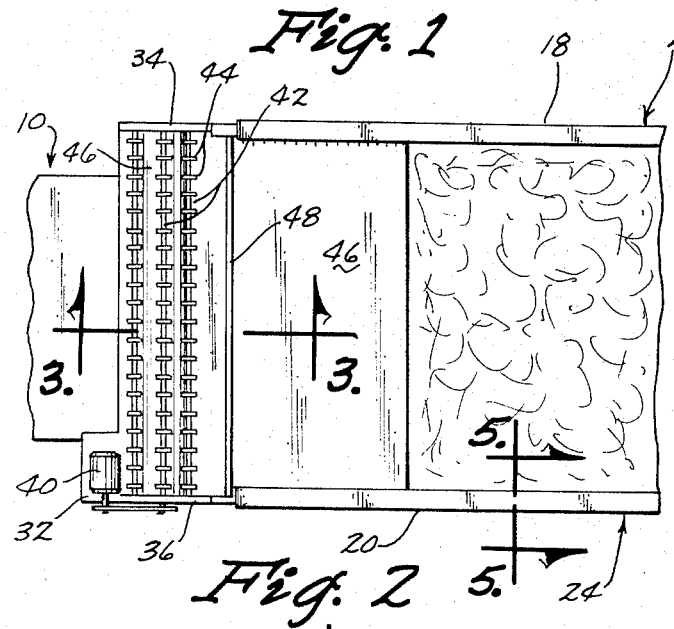
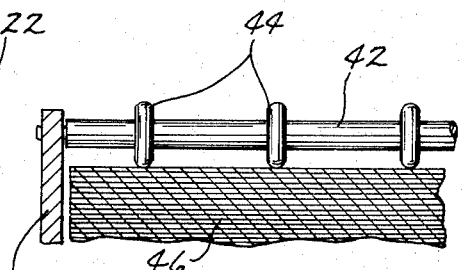
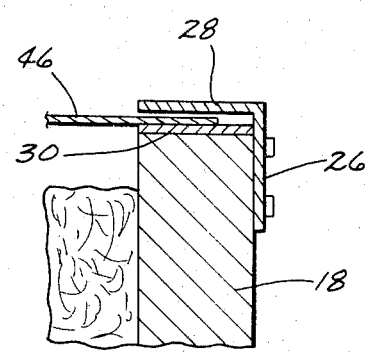
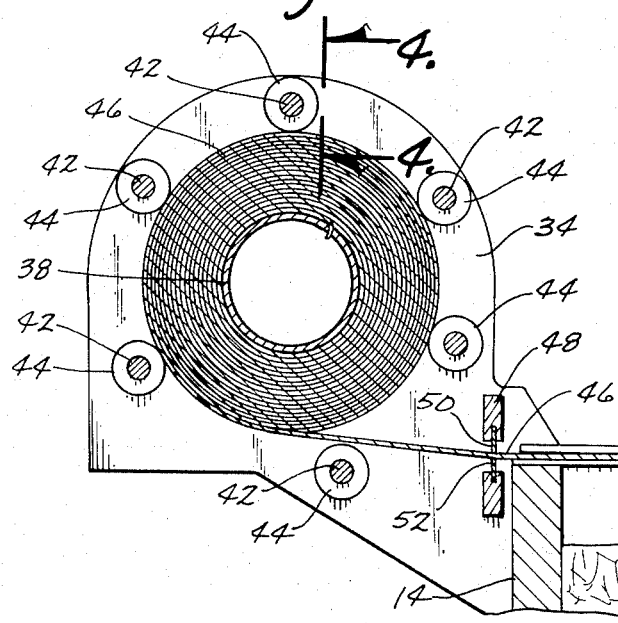

SHEET METAL COVER FOR A TRUCK BODY

Tarps or the like are commonly used to cover truck bodies. It is time consuming to install the tarps and the drivers are frequently injured in installing the tarps. Some prior art devices incorporate a series of slats or the like pivotally secured together. These slats occupy a large amount of space and are difficult to maintain.

Therefore, it is a principal object of this invention to provide an improved cover for a truck body.

A further object of this invention is to provide a sheet metal cover for a truck body.

A further object of this invention is to provide a sheet metal cover for a truck body including means to contain the sheet metal member on its support roller when wound thereon.

A further object of this invention is to provide a cover for truck bodies including means to provide lateral strength to the cover.

A further object of this invention is to provide a sheet metal cover for a truck body which is easy to use and which occupies a minimum of space when it is in its stored condition.

A still further object of this invention is to provide a cover for a truck body which is economical to manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a side view of a conventional truck having the device of this invention mounted thereon.

FIG. 2 is a partial top view of the invention as seen along lines 2-2 of FIG. 1.

FIG. 3 is an enlarged sectional view seen along lines 3—3 of FIG. 2.

FIG. 4 is an enlarged sectional view seen along lines 4—4 of FIG. 3; and

FIG. 5 is an enlarged sectional view seen along lines 5—5 of FIG. 2.

In FIG. 1, the numeral 10 refers generally to a conventional truck having a body 12 mounted thereon in conventional fashion. The body 12 includes a forward end 14, rearward end 16, and opposite side walls 18 and 20.

Guide members 22 and 24 are secured to the upper ends of the walls 18 and 20. Inasmuch as the guide members 22 and 24 are identical, only guide member 22 will be described. Guide member 22 comprises a side member 26 which is bolted to the side wall 18 as illustrated in FIG. 5. A pair of horizontally disposed and vertically spaced wall members 28 and 30 extend inwardly from the side member 26 as also illustrated in FIG. 5. FIG. 3 illustrates the fact that wall member 28 is substantially horizontal but wall member 30 defines a sinusoidal configuration with respect to the wall member 28. The sinusoidal configuration is also illustrated in FIG. 1.

A support means 32 is provided at the upper forward end of the body 12 and includes a pair of spaced apart plates 34 and 36 having a cylindrical member 38 rotatably mounted thereon and extending therebetween. A reversible motor 40 is provided and is operatively connected to the cylindrical member 38 for rotating the same in at least one direction. The motor 40 may or may not be reversible but a reversible motor is the preferred embodiment. Further, the motor 40 could be replaced by a crank means but it is preferred that a motor be used.

A plurality of shafts 42 extend between the plates 34 and 36 in a spaced apart relationship as seen in FIG. 3. A plurality of rollers 44 are mounted on the shafts 42 along the length thereof. The numeral 46 identifies the sheet metal member which is wound upon the cylindrical member 38. Sheet metal member 46 is preferably comprised of a stainless steel material, but could be comprised of other metal or stiff but resilient plastic sheets such as Formica. The sheet metal member 46 has a width sufficient so as to be received by the guide means 22 and 24 on the upper ends of the side walls of the body and has a length sufficient to reach the rearward end of the truck. A retaining means 48 also extends between the plates 34 and 36 and includes wiper elements 50 and 52 which wipe the top and bottom surfaces of the sheet metal member 46 as it moves with respect thereto.

Assuming that the sheet metal member 46 is wound upon the cylindrical member 38, the truck body is covered as follows. The sheet metal member 46 would have been previously wound on the cylindrical member 38 so that the rearward end of the sheet metal member was positioned rearwardly of the retaining means 50 so that the rearward end of the sheet metal member 46 will be received by the guides 22 and 24. The motor 40 is then energized to cause the cylindrical member 38 to rotate in a counterclockwise direction as viewed in FIG. 3 which causes the sheet metal member 46 to be unwound from the member 38 and to move rearwardly within the guide members 22 and 24. The sheet metal member 46 moves rearwardly along the wall member 30 and assumes the sinusoidal shape illustrated in FIGS. 1 and 3. The motor 40 is operated until the truck body is covered to the desired extent. When the truck body is covered, the sheet metal member 46 has assumed the sinusoidal shape illustrated in the drawings and such a sinusoidal shape provides lateral strength to the sheet metal member.

When it is desired to uncover the truck body, the motor 40 is simply energized to cause the member 38 to be rotated in a clockwise direction as viewed in FIG. 3. This rotation of the member 38 causes the sheet metal member 46 to be again wound upon the cylindrical member 38. The rollers 44 play a very important function since the sheet metal member 46 tends to unroll from the cylindrical member 38 after it has been wound thereupon. If a housing were used to enclose the wound sheet metal member 46, the sheet metal member 46 would frictionally engage the inside surface of the housing and such frictional engagement would require additional power to wind and unwind the sheet metal member.

Thus it can be seen that a vastly improved cover for a truck body has been provided herein. The stainless steel member 46 has sufficient rigidity and is easily wound upon the cylindrical member 38. The operator can control the motor 40 from within the truck which eliminates the necessity for him to crawl upon the truck. The body can be quickly and easily covered and uncovered as desired. Thus it can be seen that the cover accomplishes at least all of its stated objectives.

I claim:

1. In combination,
   a truck body having rearward and forward ends, spaced apart upstanding side walls extending between said rearward and forward ends, and and open upper end,
   a horizontally disposed cylindrical member rotatably mounted at the forward end of said truck body,
   a laterally stiff resilient sheet member wound upon said cylindrical member and having a length sufficient to extend the length of said truck body and a width sufficient to span the space between said side walls,
   guide means on the upper ends of said side walls for receiving and supporting the side edges of said sheet member at times to permit said sheet member to cover said truck body,
   and means for rotating said cylindrical member,
   each of said guide means comprising vertically spaced, substantially horizontally disposed wall members having a sheet metal member receiving area therebetween,
   the lowermost of each of said wall members of each of said guide means defining a sinusoidal configuration to provide lateral strength to the sheet metal member when said sheet metal member covers said body.

2. The combination of claim 1 wherein a plurality of elongated support members are positioned outwardly of said cylindrical member and are parallel to the longitudinal axis thereof, and a plurality of spaced apart rollers rotatably mounted on said support members for rollably containing said sheet member within said support members when said sheet member is wound upon said cylindrical member.

3. The combination of claim 1 wherein said means for rotating said cylindrical member comprises a motor means.

4. The combination of claim 3 wherein said motor means is reversible.

5. The combination of claim 1 wherein said sheet member is comprised of stainless steel.

6. The combination of claim 1 wherein each of said guide means comprises vertically spaced, substantially horizontally disposed wall members having a sheet metal member receiving area therebetween.

7. The combination of claim 1 wherein said sheet member is comprised of plastic material.

8. The combination of claim 1 wherein said sheet member is comprised of metal.

9. In combination,
   a truck body having rearward and forward ends, spaced apart upstanding side walls extending between said rearward and forward ends, and an open upper end,
   a horizontally disposed cylindrical member rotatably mounted at the forward end of said truck body,
   a laterally stiff resilient sheet member wound upon said cylindrical member and having a length sufficient to extend the length of said truck body and a width sufficient to span the space between said side walls,
   guide means on the upper ends of said side walls for receiving and supporting the side edges of said sheet member at times to permit said sheet member to cover said truck body,
   and means for rotating said cylindrical member,
   each of said guide means comprising vertically spaced, substantially horizontally disposed wall members having a sheet metal member receiving area therebetween, the lowermost of each of said wall members of each of said guide means defining a sinusoidal configuration to provide lateral strength to the sheet metal member when said sheet metal member covers said body,
   said sheet member having sufficient rigidity so that the rotation of said cylindrical member in one direction will cause said sheet member to move rearwardly over said truck body.

* * * * *